United States Patent [19]

Kurabe

[11] Patent Number: 4,946,145
[45] Date of Patent: Aug. 7, 1990

[54] AIR SUSPENSION DEVICE FOR VEHICLE SEAT

[75] Inventor: Susumu Kurabe, Akishima, Japan

[73] Assignee: Tachi-S Co., Ltd., Tokyo, Japan

[21] Appl. No.: 400,225

[22] Filed: Aug. 29, 1989

[51] Int. Cl.$^5$ .............................. F16F 5/00; B60N 2/52
[52] U.S. Cl. .................................... 267/131; 248/564; 297/348
[58] Field of Search ............... 5/11, 63; 248/564, 567, 248/574; 267/131, 133, 142, 143; 297/312, 338, 348

[56] References Cited

U.S. PATENT DOCUMENTS

| | | | |
|---|---|---|---|
| 3,632,077 | 1/1972 | Hall et al. | 267/131 X |
| 3,638,897 | 2/1972 | Harder, Jr. et al. | 297/345 X |
| 4,678,155 | 7/1987 | Carter | 248/564 |
| 4,822,094 | 4/1989 | Oldfather et al. | 297/345 X |

Primary Examiner—Duane A. Reger
Attorney, Agent, or Firm—Browdy and Neimark

[57] ABSTRACT

An air suspension device for a vehicle seat which is capable of automatic adjustment of the height of the seat at a given neutral position. In the device, an air spring is adjusted in flow of air thereinto or therefrom via a directional control valve which is actuated responsive to the vertical movements of link members, so as to adjust the height of the seat. A play is provided in the interlocking relation between the control valve and link members to avoid unnecessary actuation of the valve. Further, a manual control valve is disposed between an air source and the air spring, with a check or shuttle valve provided therein, thereby forming a direct air exhaust circuit, whereby operating the manual valve effects a rapid exhaust of air from the air spring, not via the directional control valve.

9 Claims, 4 Drawing Sheets

AIR SUSPENSION DEVICE FOR VEHICLE SEAT

BACKGROUND OF THE INVENTION

1. Field of the Invention

The present invention relates to an air suspension device of an air-back type for use in a vehicle seat, which is adjustable in shock absorbing rate according to a weight of an occupant on the seat by means of a compressed-air supply and exhaust control in an air spring of an air back.

2. Description of Prior Art

A suspension device for use in a vehicle seat has been provided for absorbing an impact or a jolting and rolling of an vehicle on a rough road and retaining a seat height (i.e. a buttock point) at a predetermined level according to a weight of an occupant on the seat. In particular, an air suspension device is known, which utilizes an air spring.

A hitherto air suspension device is of such construction that an air spring is interposed between an upper frame and a lower frame, with a linkage such a pair of X-shaped links provided between the upper and lower frames. The air spring is connected with an air supply source (an air compressor) via a directional control valve having an air supply switch pin and air exhaust switch pin, whereby the compressed air is controlled in supply into or exhaust from the air spring. Further, the linkage is provided at its joint portion with a cam which is actuated responsive to the vertical movements of the linkage so as to depress either of the two switch pins of the directional control valve.

According to the foregoing prior art, when the seat is moved upwardly or downwardly, the linkage thereunder is caused to move in the same direction, with the cam being thereby caused to rotate, pressing either of the air supply and air exhaust switch pins, whereby the air is controlled in flow direction via the control valve so as to be supplied into or exhausted from the air spring. Thus, the air spring is adjusted in inner pressure therein to provide an optimum degree of cushiony effect according to the weight of an occupant on the seat, thereby bringing the seat at a neutral position which is set by the suspension device at a standard line, permitting a good view at the front of an automobile, in reference to the eye point and buttocks point of an occupant whose weight is a fixed one for the standard purpose of the neutral position. Hence, normally, when seated by the occupant, the seat is to be lowered and retained at such neutral position, more or less, and when unseated by him or her, the seat is to be raised and retained above the neutral position.

Consequently, the thus-constructed prior art has been found defective in that, since a certain upwardly repercussive cushiony force is exerted to the occupant sitting on the seat, when he or she stands up from the seat, the seat is raised by the upwardly repercussive inner pressure of the air spring, to be followed by the buttocks of the occupant, with the result that the raised level of the seat creates a hindrance against the occupant who is supposed to descend from the seat and automobile; namely, preventing him or her from easily riding over the increased height of the seat to leave therefrom. Furthermore, when the occupant is supposed to get in and sit on the seat, the unseated seat is positioned at a relatively higher level, which also giving a hindrance against the occupant; namely, the occupant needs to lower the seat forcibly with hands at a level in which he or she may sit on the seat easily, or when the occupant sits on the seat, with a poor seating posture, he or she loses a seating posture and tumbles on the seat, due to the sudden lowering of the seat.

SUMMARY OF THE INVENTION

It is therefore a purpose of the present invention to provide an air suspension device for a vehicle seat which retains the seat at a given neutral position irrespective of the jolting of the vehicle or the weight of an occupant thereon.

In achievement of the purpose, the present invention comprises an upper frame, on which is mounted a seat cushion, a lower frame fixed on the floor of the vehicle, an X-shaped link provided between the upper and lower frames, an air spring provided between the upper and lower frames, a directional control valve disposed between an air supply source and the air spring, a manual control valve disposed between the air supply source and directional control valve, a switch cam which is fixed on the X-shaped link in the vicinity of the directional control valve, and a check valve provided in a by-pass duct extended between the manual control valve and air spring.

Accordingly, with such structure, when the seat cushion is lowered below the neutral position, due to the jolting of the vehicle, for example, the switch cam is rotated downwardly together with the X-shaped link to actuate the directional control valve for supplying an air into the air spring, thereby returning the seat cushion to the neutral position, whereas on the other hand, when the seat cushion is raised above the neutral position, due to the standing-up motion of the occupant therefrom, the switch cam is then rotated upwardly together with the X-shaped link to actuate the direction control valve for exhausting the air from the air spring, thereby lowering and returning the seat cushion to the neutral position. Thus, the seat cushion is automatically retained at the neutral position, without influence thereon from the jolting of the vehicle on the weight of the occupant.

It is another purpose of the present invention to prevent the switch cam against undesired rotation due to a slight jolting.

To this end, the switch cam is formed with a hole and a pair of opposed adjusting screws provided in the hole, and the X-link is provided with a cam actuator pin at a point corresponding to the hole such that the cam actuator pin is disposed between the two opposed adjusting screws with a space being given at the opposite sides of the cam actuator pin.

Accordingly, even when the X-shaped link is moved due to a slight jolting of the vehicle, the play given around the cam actuator pin serves to prevent the cam actuator pin from imparting the slight unnecessary movement to the switch cam, whereby is eliminated an undesired movements of the switch cam and thus the undesired actuation of the directional control valve.

DETAILED DESCRIPTION OF PREFERRED EMBODIMENTS OF THE INVENTION

Figure 1A:
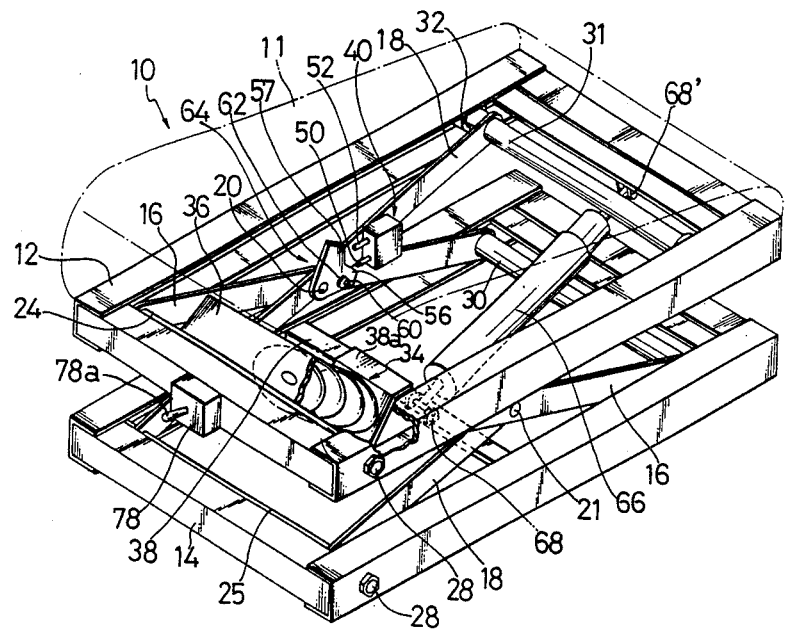
FIG. 1(A) is a partially broken, schematic perspective view of an air suspension device in accordance with the present invention.

Reference is now made to FIG. 1, in which is illustrated an air suspension device (10) for use in a vehicle seat in accordance with the present invention.

The air suspension device (10) is provided with an upper frame (12), upon which is mounted a seat cushion (11), and a lower frame (14) fixed on a floor of an automobile (not shown). Between the two frames (11)(14), a pair of X-shaped links is interposed, comprising a first two crossed link members (16)(18) and second ones (16')(18'), respectively, which allows the vertical movements of the upper frame (12) relative to the lower frame (14). Both first and second link members (16)(18)(16')(18') are rotatably crossed with each other at its central point by means of a first securing pin (20) and a second securing pin (21), respectively. At the front frame section of the upper frame (12), a connecting rod (24) is rotatably secured by means of a bolt (28), while at that of the lower frame (14), a connecting rod (25) is rotatably secured by a bolt (28) as well. The two connecting rods (24)(25) are further connected with the forward ends of the first and second link members (16)(18)(16')(18') at the bolts (28) in a pivotal manner. Rearwardly of the upper and lower frames (12)(14), two movable connecting rod (31)(30) are respectively extended, such that both ends of the connecting rods (31)(30) are provided with rollers (32), though not clearly shown, which rollers are rollable within the channel-cross-section of the lateral frame sections of both upper and lower frames. Hence, due to such slidability of the rearward upper and lower connecting rods (31)(30) along their respective lateral frame sections of both upper and lower frames (12)(14), the upper frame (12) is free to move vertically towards and away from the lower frame (14).

However, the above-described linkage is not limited to the illustrated X-shape one, but may be formed in any other proper structures, inasmuch as it permits the vertical movements of the upper frame (12) relative to the lower one (14).

Forwardly of the upper frame (12) and in a space between the two forward upper end portions of the link members (16)(16'), is provided an upper support bracket (36), extending therein transversely of the X-shaped links, and further is provided a lower support bracket (38a). As shown, an air spring (34) made of an air bag in a bellow form is mounted securely between the upper support bracket (36) and lower support bracket (38a), with a view to giving a shock absorbing or cushiony effect to the upper frame (12).

Figure 1B:
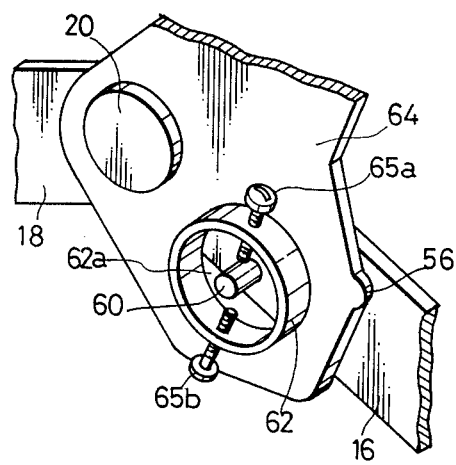
FIG. 1(B) is a partially broken perspective view of a cam used in the air suspension device.
Figure 2A:
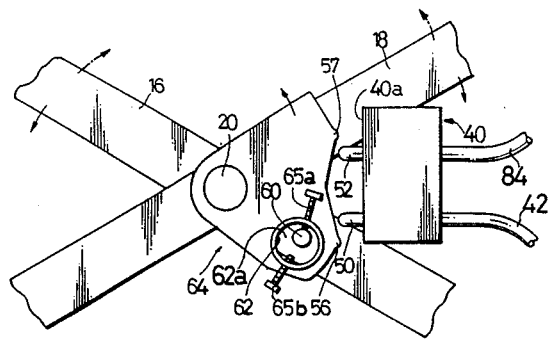
FIG. 2(A) is a schematic side view of the cam and a directional control valve, showing the state wherein a seat cushion is set at a neutral position.
Figure 2B:
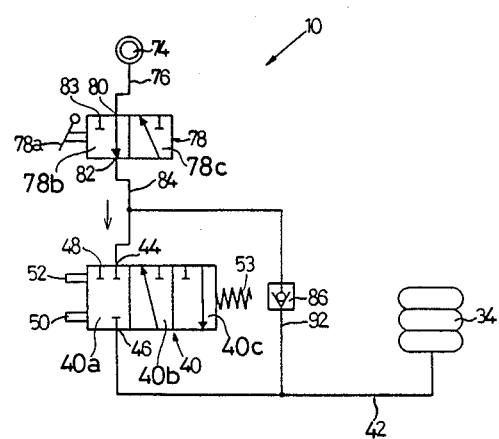
FIG. 2(B) is a block diagram of related elements of the air suspension device, which shows the state wherein the neutral position as in the FIG. 2(A) is set.

Referring now to FIG. 2(B) in conjunction with FIG. 1, the air spring (34) is communicated with a directional control valve (40) through a duct (42)

The directional control valve (40) is adapted to control the supply and exhaust of the compressed air into and from the air spring (34), and as best shown in FIG. 2(A), fixed on the link member (18), having a body casing (40a) and a pair of air supply switch pin (52) and air exhaust switch pin (50), which extend from the forward side of the body (40a) and faces towards a cam (64) to explained later.

In brief now, the construction of the directional control valve (40) is roughly shown in the schematic flow chart of FIG. 2(B), such that there are provided the three ports: An air flow entrance port (44), an air flow exit port (46) and an air exhaust port (48), by means of which, the compressed air is flowed through one of the three ports to be supplied into and exhausted from the air bag (34), and that are provided the foregoing air supply and air exhaust switch pins (52)(50), with the former pin (52) being operatively connected with the air entrance port (44) and the latter pin (50) being likewise connected with the air exit port (46), in an interlocking manner. The control valve (40) is of a three-air-direction phase type, having a closed phase (40a), an air exhaust phase (40b) and an air supply phase (40c) to be selected against a compressed air sent from an air source (74), so that the air is controlled in flow into and out of the air spring (34) as well as in its inner pressure within the spring (34).

Both air supply and air exhaust switch pins (50) (52) are resiliently biased in a forward direction from the valve casing (40a) by means of a spring (53) so that each of them is able to be projected or depressed.

Figure 3A:
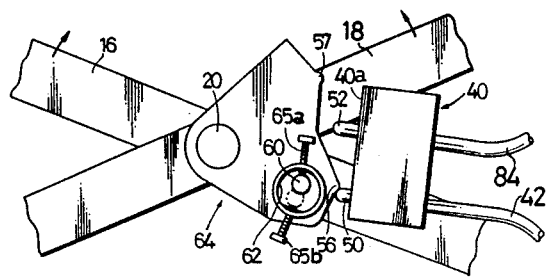
FIG. 3(A) is a schematic side view of the cam and directional control valve, showing the state wherein supply switching of the directional control valve is depressed by the cam, so as to permit a compressed air to flow into an air spring.
Figure 3B:
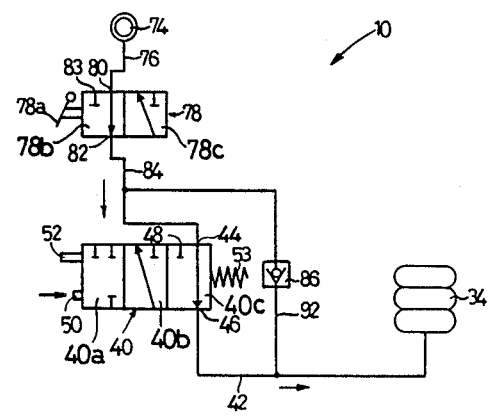
FIG. 3(B) is a block diagram of the related elements of the air suspension device, which shows the air to be flowed into the air spring as in the FIG. 3(A)

In operation, by referring to FIG. 3(B), for example, when the air supply switch pin (50) is depressed, the control valve (40) is turned to the air supply phase (40c), thereby opening the flow communication between the air flow entrance port (44) and air flow exit port (46) so as to permit the air to be flowed to the air spring (34) through the duct (42), whereas on the contrary, as in FIG. 2(B), when the air supply switch pin (50) is released from thus depressed state, projecting itself forwardly, the control valve (40) is turned to the closed phase (40a) to thereby close such flow communication between the two ports (44)(46). Alternatively, to depress the air exhaust switch pin (52) will bring the control valve (40) into the air exhaust phase (40b), opening the flow communication between the exit port (46) and exhaust port (48) (see FIG. 4(A) and 4(B)), thereby exhausting the air from the air flow system to the outside thereof.

Preferably, the directional control valve (40) is of a spring offset type in which either of the air supply and air exhaust switch pins (50)(52) is returned to its projected initial position by means of the return spring (53).

In accordance with the present invention, there is provided a switch cam (64) in a coactive relation with the foregoing two switch pins (50)(52), adjacent thereto. As best shown in FIGS. 1(B) and 2(A), the switch cam (64) is formed in a generally dogleg-shaped configuration, having, formed at its rearward upper and lower ends, a first cam surface (56) and a second cam surface (57), respectively. The first and second cam surfaces (56)(57) are to contact and depress the air supply and air exhaust switch pins (50)(52), respectively, as will be described later. Further, the switch cam (64) is rotatably secured at the crossed point in the linkage (16)(18) by means of a securing pin (20) such as to be free to rotate about that securing pin (20) which passes through the cam (64) and tow link members (15)(16) in a rotatable manner.

The switch cam (64) is formed at its lower portion with a hole (62a) and a support ring member (62) fixed in the hole (62a). Through the wall of the support ring member (62), there passes, threadedly, a pair of opposingly faced upper and lower adjusting screws (65a)(65b). A cam actuator pin (60) is fixed on the outer wall of the link member (16), projecting therefrom, such that the pin (60) is disposed between the two opposed upper and lower adjusting screws (65a)(65b) within the hole (62a). Thus, with the vertically expanding/contracting motions of the two link members (16)(18), the cam actuator pin (60) is caused to move vertically together with the link member (16), pressing either of the two opposed adjusting screws (65a)(65b) to cause the switch cam (64) to rotate vertically about the securing pin (20). Accordingly, the vertical rotation of the switch cam (64) causes either of its first and second cam surfaces (56)(57) to depress the corresponding one of the air supply switch pin (52) and air exhaust pin (50). It is to be noted however that as clearly shown in FIG. 1(B), the cam actuator pin (60) is given a space, or a play, on its opposite sides between the ends of the two adjusting screws (65a)(65b), and as such, a delay occurs in the coactive movements between the cam (64) and pin (60), with such advantage that absorbed is a slight movement of the associated link member (16) which occurs ordinarily due to the usual slight jolting or rolling of the automobile running on a road, so as not to impart an undesired movement towards the switch cam (64). Preferably, for that purpose, the switch cam (64) is normally so retained by a suitable biasing means such as a spring that the cam actuator pin (60) is normally interposed midway between the opposed two adjusting screws, with a play being given on the opposite sides of the cam actuator pin (60) between those two opposed adjusting screws. In this way, slight usual expanding-/contracting motions of the X-shaped links do not result in the undesired actuation of the control valve (40).

The two adjusting screws (65a)(65b) are adjustable in projection of their respective ends against the cam actuator pin (60) by rotating them so as to provide a desired amount of play between the cam (64) and cam actuator pin (60).

Designation (66) denotes a shock absorber adapted to absorb a sudden great impact or load, which is provided between the upper and lower frames (12)(14) such that the upper end of the shock absorber is pivotally connected to a bracket (68') at the upper frame (12) while the lower end thereof is pivotally connected to a bracket (68) at a support member (38) which is extended between both lateral frame sections of the lower frame (14).

Referring now to FIG. 2(B), is illustrated an air flow connection diagram which gives a general view on an air flow system of the air suspension device in accordance with the present invention, though not shown physically in FIG. 1(A), so that the construction of the present invention should be understood from the diagrams in FIG. 2(B) and subsequent air flow connection diagrams in FIGS. 3(B) through FIG. 7.

As shown, the air spring (34) is connected via the duct (42) with the directional control valve (40) which is in turn connected via a duct (84) with a manual control valve (78) which is provided on the front frame section of the upper frame (12)(see FIG. 1(A)). The manual control valve (78) is further connected via a duct (76) with an air supply source (74) which is preferably an air compressor.

The manual control valve (78) is of a two-air-direction phase type, having an air supply phase (78b) and an air exhaust phase (78c) to be selected for an air flow being sent from the air supply source (74), and including an air flow entrance port (80), an air flow exit port (82) and an air exhaust port (83). The manual switch (78) has a switch lever (78a) and by operating the lever (78a), the switch (78) is turned into either of the air supply and exhaust phases (78b)(78c), to thereby permit the fluid communication between the air flow entrance port (80), for the air to be supplied to the control valve (40), or between the air exhaust port (83) and air exit port (82), for the air to be exhausted exteriorly of the manual switch (78).

A by-pass duct (92) is connected with both ducts (84)(42), with a check valve (86) provided in the by-pass duct (92). The check valve (86) is adapted to cause the one-way flow of the air in a sole direction from the duct (84) at the side of the manual switch (78a) towards the duct (42) at the air spring (34).

Now, the operation of the above-described air suspension device (10) will be described hereinafter.

Firstly, let it be assumed that the seat cushion (11) is set at a certain neutral position with the air suspension device (10), and that such state will be referred to as "an initial seat height level". Then, under such initial seat height level, the switch cam (64) and directional control valve (40) are not acted with each other, as shown in FIG. 2(A), and thus, the air flow state in the device (10) is shown in FIG. 2(B). In other words, under the initial seat height level, with the switch lever (78a) of the manual control valve (78) being turned "on", a flow communication is opened between the air flow entrance port (80) and air flow exit (82), which allows the flow of a compressed air sent from the air supply source (74) towards the directional control valve (40). But, as both air supply and air exhaust switch pins (50)(52) are held away from the first and second cam surfaces (56)(57) of the switch cam (64), the directional control valve (40) is maintained in the closed phase (40a) wherein no communication is made between the air flow entrance port (44) and air flow exit port (46). This means that no air is released from the air spring (34) and at the same time, no further amount of air is supplied to the air spring (34) from the air source (74), whereupon the air spring (34) presents a given cushiony force against a load on the seat cushion (11) so as to retain the seat cushion (11) in the initial seat height level (i.e. the neutral position). Therefore, an occupant on the seat cushion (11) drives the automobile at that initial level.

But, in the case of the automobile running on a rough road, a jolting or rolling occurs in the automobile, and when the seat cushion (11) is lowered below the initial seat height level, the upper frame (12), on which is mounted the seat cushion (11), is also lowered against the upwardly biasing force of the air spring (34), causing the contracting motion of the X-shaped links as shown by the solid arrow direction in FIG. 2(A). Then, responsive to the contracting motion of the X-shaped links, as can be seen in FIG. 3(A), due to the clockwise rotation of the link member (18), the directional control valve fixed thereon is rotated downwardly with respect to the pin (20), while simultaneously, due to the counterclockwise rotation of the link member (16). the cam actuator pin (60) fixed thereon is displaced within the ring member (62) towards and abutted against the end of the upper adjusting screw (65a) which causes the switch cam (64) to rotate upwardly about the pin (20). Consequently, the air supply switch pin (50) of the control valve (40) is depressed by the first cam surface (56) of the cam (64), with the result that the control valve (40) is turned into the air supply phase (40c), opening the communication between the air flow entrance port (44) and air flow exit port (46), whereby a compressed air sent from the source (74) is supplied through the duct (76), manual control valve (78), duct (84), directional control valve (40) and duct (42) to the air spring (34), as understandable from FIG. 3(B). Thus, the amount of the air in the spring (34) is increased, thereby heightening the inner pressure of the air spring (34) and producing a higher degree of cushiony effect of the suspension device (10). The occupant, therefore, can enjoy an optimum cushion touch during jolting or rolling of the automobile.

As the air continues to be supplied into the air spring (34), the X-shaped links (16, 18) are now raised in the arrow direction as in FIG. 3(A) because of the air spring (34) being expanded vertically, at which point, the upper frame (12) is raised upwardly, and then, with the clockwise rotation of the link member (16), the cam actuator pin (60) is displaced downwardly within the ring member (62) towards the lower adjusting screw (65b), as indicated by the dotted circle in FIG. 3(A). Here, it is seen that the link member (16) is rotated ahead of the switch cam (64) and thereafter, the cam (64) is rotated together with the link member (16), by the reason of a play given between the cam actuator pin (60) and the lower adjusting screw (65b).

When the cam actuator pin (60) is abutted and pressed against the end of the lower adjusting screw (65b), the switch cam (64) is caused thereby to rotate clockwise about the pin (20), with the first cam surface (56) of the cam (64) being moved away from contact with the air supply switch pin (50), whereupon the switch pin (50) is returned to its initial non-depressed state, so as to bring the control valve (40) into the closed phase (40a), which closes the communication between the air flow entrance and exit ports (44)(46). Thus, as stated previously, no air is released from the air spring (34) and at the same time, no further amount of air is supplied to the air spring (34), which avoids a surplus supply of the air into the air spring (34) and maintains a stable cushioning effect of the suspension device (10) against any occupant with different weight. It is therefore appreciated that, when the seat cushion (11) is suddenly lowered below the initial seat height level, an air is supplied into the air spring (34) through the coordinated actions of the directional control valve (40) and cam (64) to compensate for cushioning force of the suspension device (10), in an adjustable way, to keep the seat cushion (11) positioned at the initial seat height level.

Figure 4A:
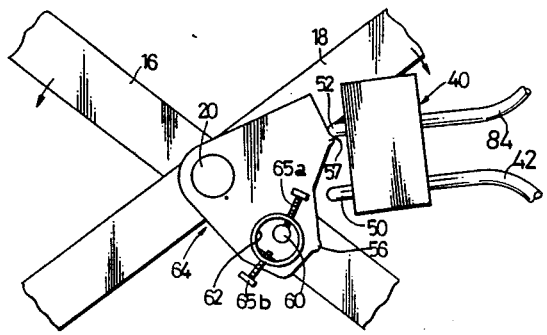
FIG. 4(A) is a schematic side view of the cam and directional control valve, showing the state wherein an air exhaust switch pin of the directional control valve is depressed by the cam so as to permit the air in the air spring to be exhausted to the outside.
Figure 4B:
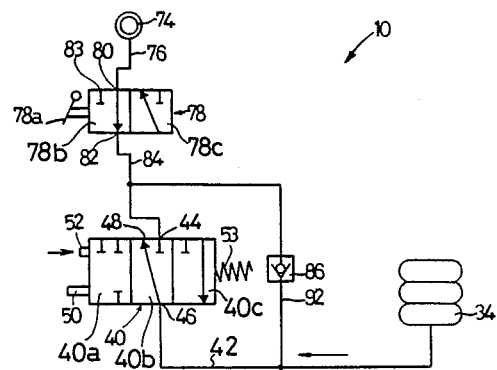
FIG. 4(B) is a block diagram, showing the air exhaust as in the FIG. 4(A)

In contrast to the foregoing seat lowering case, when the seat cushion (11) is raised above the initial seat height level in the case of the jolting of the automobile or the standing-up motion of the occupant from the seat cushion (11), the X-shaped links (16) (18) are expanded vertically in the arrow direction as shown in FIG. 3(A), which simultaneously causes the downward displacement of the cam actuator pin (60) within the ring member (62) into abutment against the end of the lower adjusting screw (56b), as indicated in the dotted circle, while at the same time the directional control valve (40) is rotated upwardly relative to the pin (20). These coactive motions release the air supply switch pin (50) from its depressed engagement with the first cam surface (56) of the cam (64). In particular, with further clockwise rotation of the link member (16), the cam actuator pin (60) is displaced further downwardly, pressing and rotating the switch cam (64) downwardly, whereby the first cam surface (56) is caused to ride over the switch pin (50), thus achieving disengagement of the switch pin (50) from the first cam surface (56). Then, the control valve (40) continues to be raised until its air exhaust switch pin (52) is brought in a depressed engagement with the second cam surface (57) as shown in FIG. 4(A). As a result, referring to FIG. 4(B), the directional control valve (40) is turned to the air exhaust phase (40b), establishing the communication between the air flow exit port (46) and air exhaust port (48). and stopping the flow of the air through the valve (40) towards the air spring (34). Therefore, the air filled in the air spring (34) is flowed back through the duct (42) into the exit port (46) of the valve (48) and eventually exhausted out of the exhaust port (48) to the outside, thereby reducing the inner pressure of the air spring (34) to lower the repercussive cushiony force thereof.

With such decrease of the cushiony force of the air spring (34), the X-shaped links (16)(18) are contracted in the arrow direction as in FIG. 4(A), lowering the upper frame (12). Then, the counterclockwise rotation of the link member (16) brings the cam actuator pin (60) to abutment against the upper adjusting screw (65a), rotating the switch cam (64) upwardly with a somewhat delay against the link member (16), whereas the clockwise rotation of the link member (18) cause the simultaneous downward rotation of the control valve (40), with the result that the air exhaust switch pin (52) is disengaged from the second cam surface (57), and thus both cam (64) and valve (40) ar returned to the initial position where the first and second cam surfaces (56)(57) of the cam (64) are disposed away from the air supply and exhaust switch pins (50)(52) with no contact therebetween, as in FIG. 2(A), which shows the seat cushion (11) to be positioned at the initial seat height level. Consequently, the control valve (40) is now turned to the closed phase (40a), preventing the air from being exhausted from the air spring (34) and stopping the further decrease of the inner pressure thereof. Then, a proper cushioning force of the air spring (34) is attained at the above-defined initial seat height level to resiliently support an occupant thereon according to his or her weight.

From the above description, it is appreciated that the seat cushion (11) is automatically retained at the initial seat height level, i.e. at the neutral position, in the suspension device (10), by virtue of the switch cam (64) taking an important role to actuate the directional control valve (40) in response to the lowering and raising of the seat cushion (11) so as to keep it retained at the neutral Position against undesired raising or lowering of the seat.

In accordance with the present invention, there is provided a direct air exhaust circuit, as understandable from FIG. 2(B), which comprises the by-pass duct (92) extended between the duct (34) associated with the manual control valve (78) and duct (42) associated with the air spring (34), and the check valve (86) provided in the by-pass duct (92). The direct air exhaust circuit is intended to permit exhaust of the air by simply operating the manual control valve (78) without need to pay any attention to the directional control valve (40).

Figure 5:
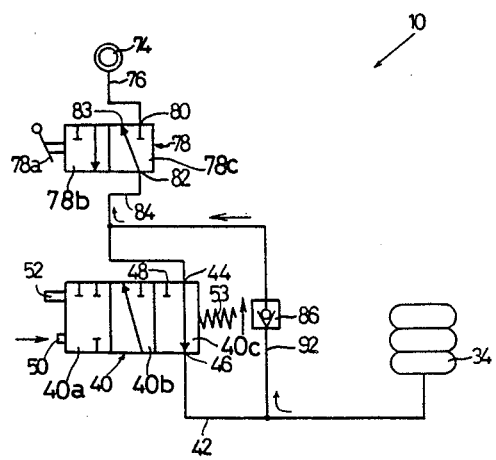
FIG. 5 is a block diagram, showing that a manual control valve is actuated to cause air exhaust through a check valve.

Specifically, when it is desired on the part of the occupant, who wishes to descend from the seat cushion (11) and get off the automobile, to lower the seat cushion (11) at a line sufficient for him or her to pass over it, the lever (78a) of the manual control valve (78) is operated so as to bring the valve (78) into the air exhaust phase (78c), as shown in FIG. 5. At this point, the air flow entrance port (30) and air flow exit port (82) are not communicated with each other, thus preventing the supplied air (sent from the source (74)) from being flowed out of the manual control valve (78). Further, as a communication is opened between the air flow exit port (82) and air exhaust port (83), the compressed air filled in the air spring (34) is naturally flowed through the duct (42) into the by-pass duct (92), and passes through the check valve (86) and duct (84) into the air flow entrance port (82), to be exhausted from the air exhaust port (83). This air exhaust results in the rapid decrease of inner pressure of the air spring (34), and the upper frame (12) is lowered rapidly down to the lowest height level, without any air supply action being made from the cam (64) and valve (40). This means that, since the air exhaust phase (78c) of the manual control valve (78) is placed in a connected relation with the air supply phase (40c) of the directional control valve (40), even if the downward contracting motion of the X-shaped links (16)(18) depresses the air supply switch pin (50), there is no flow of air between the valve (40) and air spring (34), with no air being permitted into the air spring (34), as a result of which, the air spring (34), due to a load on the seat cushion (11) or the weight of the seat cushion (11) per se, is pressed down, exhausting a residual air therein through the foregoing direct air exhaust circuit. Accordingly, the seat cushion (11) is lowered enough for the occupant to step over it and easily get off the automobile. If the lever (78a) of the manual control valve (78) remains in this "off" state for the air exhaust phase (73c), the seat cushion (11) is retained at a lowest height level, whereby the occupant may easily climb onto the seat without trouble of pushing it down.

Then, after the seat cushion (11) is lowered as above and seated by the occupant, to turn "on" the lever (78a) for placing the valve (78) in the air supply phase (78b) opens a flow communication between the air flow entrance and exit ports (80)(82), whereby the compressed air from the source (74) is supplied through the manual control valve (78), directional control valve (40), and duct (42), into the air spring (34). The air spring (34) is thereby expanded vertically to push and raise the X-shaped links (16)(18) and upper frame (12), until the first cam surface (56) is disengaged from the air supply switch pin (50). At the disengagement between the first cam surface (56) and switch pin (50), the directional control valve (40) is turned to the closed phase (40a) as in FIG. 2(B), retaining the seat cushion (11) at the initial seat height level, so that the occupant is brought upwardly to a proper initial seating height according to his or her weight.

Figure 6:
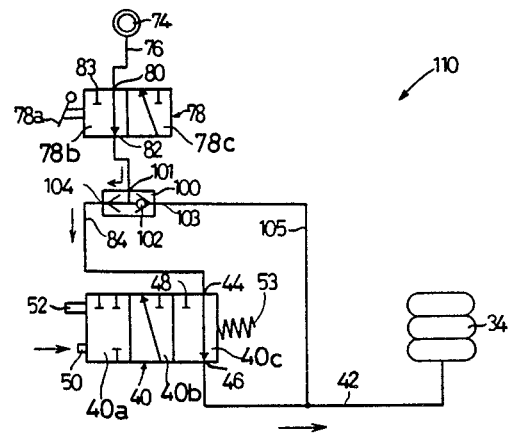
FIG. 6 is a block diagram, in which a shuttle valve is employed, showing the flow of air into the air spring.
Figure 7:
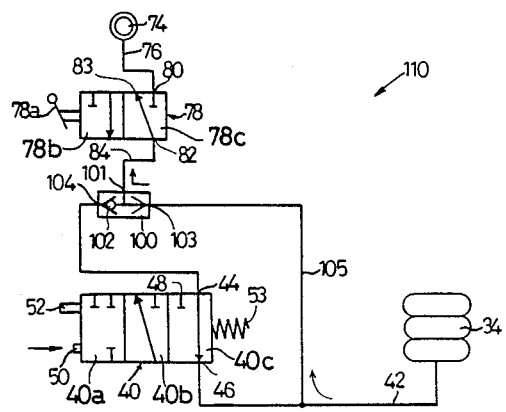
FIG. 7 is a block diagram which shows the air exhaust in the system as in the FIG. 6.

Reference is now made to FIGS. 6 and 7, in which is illustrated another embodiment of the direct air exhaust circuit. In this embodiment, in place of the foregoing check valve (86), a shuttle valve (100) is employed, which comprises an air flow entrance port (101), air flow exit port (104), air exhaust port (103), and a shuttle valve piece (102) which is free to be shuttled between the air flow exit port (104) and air exhaust port (103). As shown, both air flow entrance and exit ports (101)(104) are connected via the duct (84) with each other, with the former (101) being communicated with the manual control valve (78) and the latter (104) being communicated with the directional control valve (40). The air exhaust port (103) is communicated via a by-pass duct (105) with the duct (42) at the air spring (34). The by-pass duct (105) between the shuttle valve (100) and dust (42) is arranged in a parallel relation with the duct (84).

In operation, according to the present embodiment (hereinafter to be designated by numeral (110)) of suspension device using the shuttle valve (100), when the seat cushion (11) is lowered below the initial seat height level due to a jolting or rolling of the automobile, for example, a compressed air from the air supply source (74) is flowed through the manual control valve (78), whose lever (78a) is turned "on" for the air supply phase (78b), into the air flow entrance port (101) of the shuttle valve (100). Responsive to such air entrance into the shuttle valve (100), the shuttle valve piece (102) is moved towards the air exhaust port (103), closing the same, and guiding the air to the exit port (104), from which the air is flowed through the duct (84) into the air flow entrance port (44) of the directional control valve (40). As the directional control valve (40) is turned to the air supply phase (40c), because the X-shaped links (16)(18) are contracted, with the first cam surface (56) depressing the air supply switch pin (50), as stated previously, the air is flowed through the air entrance and exit ports (44)(46) and transmitted through the duct (42) into the air spring (34). Thus, the seat cushion (11) is raised towards and retained at the initial height level, like the above description on the embodiment as in FIGS. 3(A) and 3(B).

Now, as shown in FIG. 7, when the lever (73a) is turned "off" for placing the manual control valve (48) in the air exhaust phase (78c), the air from the source (74) is no longer supplied through the valve (48) to the directional control valve (40), and, as a communication is opened between the air flow exit port (82) and air exhaust port (83), the air filled in the air spring (34) is flowed back via the by-pass duct (105) into the air exhaust port (103) of the shuttle valve (100), which displaces the shuttle valve piece (102) toward the air flow exit port (104), closing the same, and guiding the air to the entrance port (101), from which the air is flowed through the duct (84) into the air flow exit port (82) of the manual control valve (78). Then, the air is blown out from the exhaust port (83) of the valve (78), like the previous descriptions on the embodiment as in FIG. 5.

Accordingly, in this embodiment of direct air exhaust circuit using the shuttle valve (100), a rapid air exhaust can be effected by simply turning "off" the lever (78a) of the manual control valve (78), and further the shuttle valve (100) per se serves as a coupling which connects the duct (84) with the by-pass one (105), thus eliminating the need to equip a separate coupling therein.

From the descriptions above, in accordance with the present invention, it is to be appreciated that (i) the seat cushion (11) is automatically retained in a given neutral position, without influence thereon from a jolting or rolling of the automobile or the weight of an occupant on the seat: When the sea cushion (11) is raised or lowered beyond the neutral position, the switch cam (64) is rotated together with the linkage (16, 18) to actuate the directional control valve (40) to control the air supply/exhaust into or from the air spring (34), thereby raising or lowering the seat cushion (11), in adjusting way, so as to keep placing the same in the neutral position, (ii) the hole (62a), ring member (62) and two opposed adjusting screws (64) at the switch cam (64) constitute a play zone in which to give a play to the vertical movements of the cam actuator pin (60) and thus avoid undesired rotation of the switch cam (64) due to an unnecessary slight motion of the associated link member (16), whereby the slight movements of the link members (16, 18) are absorbed, not being imparted to the switch cam (64), and (iii) the provision of such direct air exhaust circuit comprising the combination of the check valve (86) (or the shuttle valve (100)) and by-pass duct (92)(or the one (105)) is effective in realizing a rapid air exhaust from the air spring (34) in cooperation with the manual control valve (78), which causes the lowering of the seat cushion (11) to a lowest level below the neutral position and thus permits an occupant to step over the seat cushion (11) and get off the automobile, or to easily climb into the seat in the automobile.

While having the present invention as above, it should be understood that the invention is not limited to the illustrated embodiments but any other modifications, replacements and additions may structurally be possible without departing from the spirits and scopes of the appended claims. For example instead of the switch cam (64)' any other proper means may be used insofar as it serves to depress either of the air supply and air exhaust switch pins (50)(52) in a coordinated, interlocking relation with the vertical movements of the upper frame (12). Further, the switch cam (24) may be rotatably secured on the forward lower connecting rod (25) adjacent to the link member (16), and the directional control valve (40) is fixed on the link member (18) in an opposed relation with the switch cam (24), with such an arrangement that the switch cam (24) is formed with the hole (62a), ring member (62) and two opposed adjusting screws (65a)(65b), whereas the cam actuator pin (60) is fixed on the link member at a point corresponding to the hole (62a), similarly to the above embodiments. The manual control valve (78), directional control valve (40), check valve (86) and shuttle valve (100) may be constructed in any desired form on the basis of the block diagrams in the drawings.

What is claimed is:

1. An air suspension device for a vehicle seat, in which said seat includes a seat cushion, comprising:
   an upper frame on which said seat cushion is mounted;
   a lower frame fixed on a floor of said vehicle;
   an X-shaped link provided between said upper and lower frames, said X-shaped being expandable and contractible vertically;
   an air spring interposed between said upper and lower frames;
   an air supply source adapted to supply a compressed air into said air spring;
   a control valve disposed between said air spring and air supply source, said control valve being adapted to control supply and exhaust of said compressed air into and from said air spring;
   a manual control valve disposed between said air supply source and said control valve;
   a check valve disposed between said manual control valve and air spring in a parallel relation with said control valve, said check valve being adapted to permit flow of said compressed air in a sole direction from said air spring towards said manual control valve.

2. The air suspension device according to claim 1, wherein, instead of said check valve, a shuttle valve is disposed between said manual control valve and control valve, with a by-pass duct being connected at its one end with said shuttle valve and at its other end with said air spring, communicating said air spring with said shuttle valve, and wherein said shuttle valve is adapted to permit flow of said compressed air, selectively, in one of a direction from said manual control valve towards said control valve and a direction from said air spring towards said manual control valve.

3. The air suspension device according to claim 1, wherein said control valve is of a three-air-direction-phase type having a closed phase, an air supply phase, and an air exhaust phase to be selected against said compressed air being sent from said air supply source, and further including an air flow entrance port, an air flow exit port and an air exhaust port, wherein an air supply switch pin is operatively connected with said air flow entrance port whereas an air exhaust switch pin is operatively connected with said air exhaust port, such that both said air supply and air exhaust switch pins are projected outwardly from said control valve, and wherein said control valve is fixed on said X-shaped link.

4. The air suspension device according to claim 3, wherein a switch means is movably provided at said X-shaped link, with such an arrangement that, when said X-shaped link is contracted downwardly, said switch means is moved to depress said air supply switch so as to place said control valve in said air supply phase, permitting flow of said compressed air into said air spring, whereas when said X-shaped link is expanded upwardly, said switch means is moved to depress said air exhaust switch so as to place said control valve in said air exhaust phase, permitting exhaust of said air from said air spring, and further that, when said switch means is held away from said air supply and air exhaust switch pins, said control valve is placed in said closed phase, preventing flow of said air between said air supply source and air spring.

5. The air suspension device according to claim 4, wherein said switch means comprises a cam which is provided at a securing pin of said X-shaped link in a vertically rotatable manner, wherein said cam includes a first cam surface and a second cam surface, wherein, with vertical expanding and contracting motion of said X-links, said cam is caused to rotate, bringing said first cam surface to contact with said air supply switch pin, depressing the same, and bringing said second cam surface to contact with said air exhaust switch pin, depressing the same, to thereby control flow of said air between said air supply source and air spring, wherein said cam is formed with a hole, and wherein there is formed a cam actuator pin on said X-link at a point corresponding to said hole such that said cam actuator pin is disposed within said hole with a play given surrounding said cam actuator pin.

6. The air suspension device according to claim 5, wherein, at said hole formed in said cam, are provided a ring member and a pair of adjusting screws, such that said pair of adjusting screws are threadedly provided in said ring member in an opposed relation with each other and that said cam actuator pin is disposed between said pair of adjusting screws with a space given on opposite sides of said cam actuator pin.

7. The air suspension device according to claim 1, wherein said manual control valve is provided at a front frame section of said upper frame.

8. The air suspension device according to claim 1, wherein said manual control valve is of a two-air-direction-phase type having an air supply phase and an air exhaust phase to be selected against said compressed air from said air supply source and air spring, and further including an air flow entrance port, an air flow exit port and air exhaust port.

9. The air suspension device according to claim 1, wherein said suspension device includes a first duct extended between said air supply source and manual control valve, providing a flow communication therebetween, a second duct extended between said manual control valve and control valve, providing a communication therebetween, a third duct extended between said control valve and air spring, and a bypass duct extended between said second duct and third duct, with said check valve provided in said by-pass duct, providing a one-way flow communication between said manual control valve and air spring.

* * * * *